United States Patent Office 3,425,792
Patented Feb. 4, 1969

3,425,792
OXIDATION CATALYSTS
Ruth E. Stephens, Detroit, Mich., assignor to Ethyl Corporation, New York, N.Y., a corporation of Virginia
No Drawing. Filed Mar. 12, 1965, Ser. No. 439,443
U.S. Cl. 23—2
Int. Cl. C01b 13/14
13 Claims

ABSTRACT OF THE DISCLOSURE

Exhaust gas is oxidized by a supported platinum catalyst promoted with a lead compound.

---

This invention relates to novel lead promoted platinum oxidation catalysts and to methods for preparing them. Moreover, it relates to a novel method for the oxidation of hydrocarbons and carbon monoxide constituents of the exhaust gases produced by internal combustion engines.

Atmospheric pollution has of recent years become a critical problem in many areas. Certain atmospheric contaminants have been found to be injurious to plant life. According to recent estimates, the plant damage due to atmospheric contaminants in twenty-six California counties amounts to about ten million dollars annually. Furthermore, atmospheric contaminants are also injurious to human health. For example, carbon monoxide is extremely toxic and in high concentrations can cause death. Many authorities have stated that atmospheric contaminants contribute to the rising incidence of respiratory disease.

Certain types of atmospheric contaminants are potent eye irritants. Contaminants that cause eye irritation are formed by a series of chemical reactions involving sunlight, air, nitrogen dioxide and hydrocarbons. Nitrogen dioxide is a minor constituent of automobile exhaust. Nitrogen dioxide in the presence of sunlight forms nitrous oxide plus nascent oxygen. Nascent oxygen reacts with atmospheric oxygen to form ozone. Ozone in turn reacts with olefinic hydrocarbons present in the atmosphere to form aldehyde compounds which have eye-irritating properties.

Furthermore, certain radicals formed by the ozonolysis of olefins in the atmosphere can react with atmospheric oxygen and nitrogen dioxide to form peroxyacyl nitrates. These substances cause eye irritation and plant damage. In summary, the combination of sunlight, nitrogen dioxide, hydrocarbons and air can lead to the "smog" presently encountered in certain areas, notably Los Angeles. Removing any one of the foregoing required components will obviate the formation of smog.

There are several sources of hydrocarbons in the atmosphere. One source is the crank case vent on the automobile engine. The gases which evolve from the crank case vent originate from piston blow-by. Another source of hydrocarbon and carbon monozide contamination is automobile exhaust.

Organic emissions from automobiles include unburned paraffinic, olefinic and aromatic hydrocarbons. These components have varying abilities once in the atmosphere to participate in the reactions producing the aforementioned noxious contaminants. Published results show that olefins and aromatic hydrocarbons participate in these reactions. Most paraffins do not enter into these reactions. Some higher molecular weight paraffinic hydrocarbons react with atmospheric substituents, but published reports teach that eye irritants or phytotoxicants are not produced. Therefore, the olefins and aromatic substances are the deleterious hydrocarbons in exhaust emissions.

Heretofore, several exhaust gas oxidation catalysts have been developed having acceptable ability to catalyze the oxidation of paraffinic hydrocarbons. However, many of these oxidation catalysts are inactive towards olefinic and aromatic hydrocarbons. An important feature of the instant invention is the discovery that lead promoted platinum catalysts readily oxidize olefinic and aromatic substituents and thereby exhibit a selectivity which is just the opposite of that exhibited by most prior art oxidation catalysts and even by a platinum catalyst not promoted with lead. In other words, nonlead promoted platinum catalysts readily catalyze the oxidation of aliphatic hydrocarbons but are relatively poor catalysts for the oxidation of olefinic and aromatic materials, and in direct contrast to these prior art catalysts, the lead promoted platinum catalysts of this invention are most effective in catalyzing the oxidation of olefinic and aromatic hydrocarbons. The lead promoted platinum catalysts of this invention display the further beneficial property of becoming active at low temperatures and maintaining this low temperature activity during long periods of operation, even under the most adverse conditions.

An object of this invention is to provide novel catalyst compositions. A further object is to provide a method for preparing these novel catalyst compositions. Another object is to provide a method of reducing the unburned hydrocarbon and carbon monoxide constituents of the exhaust gas of internal combustion engines and especially to reduce the amount of unburned olefinic constituents and aromatic constituents in this exhaust gas. Other objects will become apparent in the following detailed description of the invention.

These and other objects of this invention are accomplished by providing lead promoted platinum catalysts. A preferred catalyst of this invention comprises a suitable support containing platinum in any valence state (including zero, i.e., metallic platinum) and a lead compound.

An embodiment of the present invention is a catalyst consisting essentially of a suitable support containing platinum promoted with a compound of lead. A more preferred embodiment of this invention is a catalyst consisting essentially of an activated alumina support containing from about 0.0005 to 5 weight percent platinum either as metallic platinum or a compound of platinum promoted with from about 0.001 to 75 weight percent lead as a compound of lead. A most preferred embodiment of this invention is a catalyst consisting essentially of an activated alumina containing from about 0.001 to 1 weight percent platinum and from about 0.01 to 25 weight percent lead as a compound of lead. All percentages are based upon the weight of the complete catalyst.

A variety of materials may be used as the carrier in the preparation of the catalysts of this invention. Included among these are aluminum oxides and hydroxides, activated transitional aluminas, aluminum silicates, aluminum gels, thoria, magnesia, zirconia, calcium phosphate, and the like. The preferred catalyst supports are the alumina type supports. Lead promoted platinum catalysts or alumina type supports have been found to be excellent catalysts for the oxidation of the aromatic and olefinic constituents of the exhaust gas of internal combustion engines. These alumina type supports include the porous aluminum oxides in various states of oxidation and hydration as well as aluminum hydroxide. Of the alumina carriers, the activated transitional aluminas are preferred. These aluminas are metastable forms which are produced by heating an alpha- or beta-trihydrate or alpha-alumina monohydrate to temperatures of from about 150 to about 800° C. As these starting materials are heated, phase changes take place, and on prolonged heating, and particularly at very high temperatures such as over 1000° C., they are converted into alpha-alumina, which is a stable refractory type alumina, which is not a preferred support for the lead promoted platinum catalysts of this invention. The preferred materials are the aluminas in an intermediate degree of hydration and crystallization, commonly referred to as activated or transitional aluminas. These aluminas are known as gamma, delta, eta, theta, kappa, chi and rho aluminas, depending upon the choice of starting material and the degree and length of time of heat treatment. This nomenclature is set forth in the pamphlet "Alumina Properties," Russell et al., published by the Aluminum Company of America, Pittsburgh, Pa. (1956). Any of the above listed transitional aluminas can be used in the catalysts of this invention. Commercial aluminas are available which usually consist of mixtures of the above identified aluminas and have been found to give excellent results when used to prepare the lead promoted platinum catalysts of the present invention.

Preferred transitional alumina supports have a surface area of at least 75 m.$^2$/g. and a nominal silica content of from about 0.1 to 10 weight percent. An especially preferred form of silica in the support is in the form of a clay. A most preferred clay is kaolin. Catalysts prepared using these high surface area silica aluminas have been found to have superior property with respect to longevity and resistance to the abrasive action encountered in actual use.

The supports used in the catalysts of this invention are frequently treated with phosphoric or sulfuric acid prior to the addition of the lead or platinum. It is believed that the function performed by this acid treatment is to subsequently entrap the lead from the lead impregnating solution by converting it in the support to the insoluble lead phosphate or sulfate. These are the preferred forms of the lead in the catalyst. They are non-volatile and, moreover, they are not scavenged from the catalyst by halogens normally present in the exhaust gas stream.

The acid treatment is carried out by immersing the carrier in the acid and allowing it to stand therein about 1 to 4 hours. The preferred quantity of acid is about 50 to 500 parts per 1000 parts of carrier. A preferred range is from 100 to 300 parts, and a most preferred range is from 150 to 250 parts of acid per 1000 parts of catalyst. It is also preferred to dilute the acid with water to about 25 to 50 percent. A most preferred acid strength is from about 30 to 40 weight percent.

Another class of materials that can be employed as a support for the lead promoted platinum catalysts of this invention consists of materials having a hexagonal apatite structure. They are described in a publication entitled "Crystal Structures," by Ralph W. G. Wyckoff, vol. II, chapter VIII, table page 85, Interscience Publishers, 1951, New York. They include minerals such as:

$Ba_{10}(OH)_2(PO_4)_6$  $Ca_9(H_2O)_2(PO_4)_6$
$Ca_{10}Cl_2(PO_4)_6$  $Pb_{10}Cl_2(AsO_4)_6$
$Ca_{10}F_2(PO_4)_6$  $Pb_{10}Cl_2(PO_4)_6$
$Ca_{10}O(PO_4)_6$  $Pb_{10}(OH)_2(PO_4)_6$
$Ca_{10}(OH)_2(PO_4)_6$  $Pb_{10}Cl_2(VO_4)_6$
$Ca_9CdF_2(PO_4)_6$  $Pb_9(AsO_4)_6$
$Ca_5Cd_5F_2(PO_4)_6$  $Pb_9(PO_4)_6$
$Ca_4Na_6F_2(SO_4)_6$  $Sr_{10}(OH)_2(PO_4)_6$

The preferred hexagonal apatites are those having the composition $$MX_n \cdot 3M'_y Z_{n'}$$

wherein M and M' represent metal cations having the valence $n$ and $n'$ wherein $n$ and $n'$ are the same or different, X is a halogen and Z is a radical of valence $y$ and is selected from the group consisting of phosphate, arsenate, vanadate and sulfate anions.

The preferred metals M and M' are Groups II–A, II–B and IV–A metals. Examples of these are calcium, strontium, barium, beryllium, magnesium, zinc, cadmium, mercury, germanium, tin and lead. The most preferred metals are calcium and lead.

The most preferred radical represented by Z is the phosphate radical, $(PO_4)^{-3}$. This radical leads to particularly suitable catalyst supports. Furthermore, the phosphate apatite structures are readily available and frequently occur naturally as minerals. The more preferred metals are selected from the group consisting of lead and Groups II–A and II–B metals and display a valence of two. Compounds of this preferred class are represented by the formula:

$$MX_2 \cdot 3M'_3(PO_4)_2$$

wherein M and M' are selected from the group consisting of lead and the Groups II–A and II–B metals, and X is a halogen. Some examples of these preferred apatite structures are:

$ZnI_2 \cdot 3Ca_3(PO_4)_2$  $CaCl_2 \cdot 3Ca_3(PO_4)_2$
$BeCl_2 \cdot 3Mg_3(PO_4)_2$  $BaBr_2 \cdot 3Ca_3(PO_4)_2$
$BaCl_2 \cdot 3Ba_3(PO_4)_2$  $SrF_2 \cdot 3Ba_3(PO_4)_2$
$PbCl_2 \cdot 3Be_3(PO_4)_2$  $CdI_2 \cdot 3Mg_3(PO_4)_2$
$MgBr_2 \cdot 3Sn_3(PO_4)_2$  $CaCl_2 \cdot 3Pb_3(PO_4)_2$ The most preferred hexagonal apatites are those wherein Z is the phosphate anion and M and M' are calcium or lead, and the most particularly preferred hexagonal apatites are those wherein at least one of the metals M or M' is lead. Examples of such compounds are:

$$PbCl_2 \cdot 3Pb_3(PO_4)_2$$
$$CaBr_2 \cdot 3Pb_3(PO_4)_2$$
$$PbF_2 \cdot 3Ca_3(PO_4)_2$$

Lead containing hexagonal apatites such as these perform the dual role of both catalyst support and lead promotion of the platinum.

In preparing the catalyst of this invention, the support is impregnated or mixed with a compound of platinum. Insoluble platinum compounds can be employed by digesting the support to a pasty mass with acid and then mixing the insoluble platinum compound with the mass. The mass can then be extruded, dried and calcined in a manner well known in the catalyst art. Another method of incorporating an insoluble platinum compound into the catalyst is to dry mix the platinum compound with a dry powdered support material and then compress the platinum containing powder into a catalyst tablet. These methods are also well known in the catalyst industry. Some examples of water insoluble platinum compounds that can be employed following the above procedure are platinous bromide, platinous cyanide, platinous hydroxide, platinic oxide, platinous oxide and platinous sulfide.

The preferred platinum compounds used in the preparation of the catalysts of this invention are the water soluble platinum compounds. When water soluble compounds are employed the catalyst support can be merely immersed in an aqueous solution of the platinum compound and will thereby become impregnated with the platinum compound. Examples of some preferred soluble platinum compounds that can be employed in this impregnation process include platinic chloride, platinic sulfate and chloroplatinic acid.

Lead compounds that can be incorporated into the catalyst of this invention include those whose volatility is sufficiently low so that they remain in the catalyst support at temperatures up to about 1400° F. Preferred lead compounds include the lead oxide, lead sulfides and the lead salts of the simple fatty and mineral acids. Examples of these compounds include lead carbonate, basic lead carbonate, lead formate, lead acetate, lead chloride, lead nitrate, lead cyanide, lead suboxide, lead oxide, red lead oxide, lead sesquioxide and lead sulfide. Especially preferred lead compounds are the lead salts of phosphorus or sulfur containing mineral acids such as lead sulfate, lead sulfite, basic lead sulfate, lead phosphite and lead phosphate. The most preferred lead compound used to promote the platinum catalysts of this invention is lead orthophosphate.

Lead compounds having some water solubility can be incorporated into the catalyst support by impregnating the support with an aqueous solution of the lead compound in the same manner used for impregnating with a solution of a platinum compound. In fact, a convenient method is to impregnate the support with the platinum and lead compound in a single operation. The preferred lead compounds that can be used in impregnating the catalysts of this invention include those that are water soluble. Examples of such compounds include lead acetate, lead nitrate, and the like. A convenient method for increasing the solubility of many lead salts is to employ a concentrated aqueous ammonium acetate solution as the solvent for the lead compound. In this manner, normally insoluble lead compounds can be incorporated into the catalyst support using the impregnation process.

An alternate method of incorporating the lead compound into the catalyst is to mix the lead compound with the carrier material in a dry powdered or granular state and subsequently to digest the composite with an acid to a pasty mass. The pasty mass is then extruded, dried, and calcined at temperatures up to about 700° C. Following this, the lead containing catalyst can be impregnated with a platinum compound in the manner previously set forth. When this process is followed the carrier material should be of a type that will digest in the presence of an acid to form a pasty mass. Aluminas are well suited for this method, especially the gel type aluminas. Acids used to digest the alumina can be any of the strong mineral acids. Especially preferred acids are the sulfur or phosphorus containing mineral acids. A most preferred acid that can be used in this method of preparing lead promoted catalysts is phosphoric acid.

Another method of incorporating lead into the catalyst support is to mix the powdered lead compound with a powdered form of the support material and then compress the composite into a catalyst pellet or tablet. These methods are well known in the catalyst industry.

From the foregoing discussion, it is apparent that many methods are available for preparing the catalysts of this invention. The following examples will serve to illustrate some of these methods of preparing these unique catalysts. All parts are parts by weight unless otherwise indicated.

EXAMPLE 1

One thousand parts of alumina obtained from Kaiser Aluminum Company, designated KA-101, are immersed in a solution of 150 parts orthophosphoric acid in 200 parts water and allowed to stand for 2 hours. This alumina had the following composition and properties:

| | |
|---|---|
| $Al_2O_3$, percent | >90 |
| $Na_2O$, percent | 0.4 |
| $Fe_2O_3$, percent | 0.02 |
| $SiO_2$, percent | 0.02 |
| Loss in ignition at 1100° C., percent | 4.2 |
| Surface area (m.²/q.) | 360 |
| Bulk density (lb./ft.³) | 43 |

Following this, the phosphoric acid treated support is immersed in a solution of 300 parts lead acetate in 2000 parts water. It is then dried and calcined to a temperature of 550° C. Following this, it is impregnated with platinic chloride by immersing it in an aqueous solution containing 0.5 part of platinum as platinic chloride. The impregnated catalyst is then dried and calcined at 700° C., resulting in a catalyst consisting essentially of an activated transitional alumina containing 10 weight percent lead, primarily as lead phosphate, and 0.05 weight percent platinum.

Other catalyst supports can be employed in the above example with similar results. For example, thoria, zirconia, magnesia, aluminum silicate or calcium phosphate can be employed, resulting in an efficient catalyst of this invention.

EXAMPLE 2

One thousand parts of an activated transitional alumina are ground to a powder and mixed with 13 parts of powdered lead phosphate. After thorough mixing, the composite is compressed into catalyst tablets. The compressed tablets are then immersed into an aqueous solution containing 3 parts of platinum as chloroplatinic acid. The impregnated catalyst is then dried at 50–75° C. for one hour and subsequently heated over a 3 hour period to 600° C. It is then allowed to cool, resulting in a catalyst consisting essentially of an alumina support containing about one weight percent lead as lead orthophosphate and 0.3 weight percent platinum.

Similar results can be obtained using other lead compounds in place of lead phosphate. For example, lead carbonate, basic lead carbonate, lead chloride, lead cyanide, lead suboxide, lead oxide, red lead oxide, lead sesquioxide, lead sulfide, and the like, can be beneficially employed.

EXAMPLE 3

Eight hundred parts of 1/16 inch diameter activated silica alumina extrusion (nominal 5 weight percent silica content) were treated with a solution made from 128 parts orthophosphoric acid and 280 parts water. After 10 minutes, the liquid phase was drained off and the so-treated silica alumina was dried. Following this, the alumina was immersed in an aqueous solution containing 250 parts of lead nitrate. After standing in this solution for 2 hours, the liquid phase was drained and the lead impregnated alumina dried and then heated to 650° C. for one-half hour. Following this, the lead containing silica alumina was immersed in 350 parts of an aqueous solution containing 0.4 gram of platinum as chloroplatinic acid. After standing an hour in this solution, the remaining liquid phase was drained and the catalyst dried and heated to 750° C. for one hour, resulting in a catalyst consisting essentially of a silica alumina support containing 12 weight percent lead, primarily as lead phosphate, and 0.05 weight percent platinum.

Similar results can be obtained in the above example when sulfuric acid is used in place of orthophosphoric acid in pretreating the alumina. When this is done, the lead deposits in the alumina primarily in the form of the insoluble lead sulfate.

EXAMPLE 4

One thousand parts of alumina gel are digested using a solution of 150 parts orthophosphoric acid in 500 parts of water to form a pasty mass. To this is added 200 parts lead oxide and 10 parts platinum as platinous chloride. After thoroughly mixing, the mass is extruded in the form of 1/16 inch extrudate about 1/4 inch long. It is then dried 12 hours at about 100° C., following which it is calcined to a maximum temperature of 700° C. over a 4 hour period, yielding a catalyst containing about 18 weight percent lead and one weight percent platinum.

In the above example, similar results can be obtained when other acids are employed in place of orthophosphoric acid. For example, sulfuric, nitric or hydrochloric acid can be employed.

EXAMPLE 5

One thousand parts of an activated transitional silica alumina (nominal 5 weight percent silica content) were treated with a solution made up of 1000 parts of water, 300 parts ammonium acetate and 100 parts of lead sulfate. After standing in the solution for one hour, the remaining liquid phase is decanted and the lead sulfate impregnated silica alumina is dried and heated to 550° C. for one hour. It is then immersed in 500 parts of an aqueous solution containing .02 part platinum as chloroplatinic acid. The lead platinum containing catalyst is then dried and subsequently heated to 700° C. over a 4 hour period, resulting in a catalyst consisting essentially of a silica alumina containing about 5 weight percent lead, primarily as lead sulfate, and 0.002 weight percent platinum.

Similar results can be obtained in the above example when more or less platinum is employed. For example, aqueous solutions containing from as little as 0.005 to as much as 50 parts of platinum as chloroplatinic acid can be beneficially employed to obtain a catalyst of this invention containing from 0.0005 to 5.0 weight percent platinum promoted with lead.

EXAMPLE 6

One thousand parts of a catalyst support having a hexagonal apatite crystal structure and having the composition $PbF_2 \cdot 3Ca_3(PO_4)_2$ is crushed into granules about ⅛ inch diameter. The support is then immersed in an aqueous solution containing 0.6 part of platinum as chloroplatinic acid. After standing an hour the remaining aqueous phase is decanted and the catalyst dried at 50° C. for 4 hours. It is then heated to 350° C. for an hour, yielding a catalyst containing 0.06 weight percent platinum and about 17.5 weight percent lead.

In a similar manner, other related lead containing hexagonal apatite supports can be employed, such as pyromorphite, $PbCl_2 \cdot 3Pb_3(PO_4)_2$, yielding a platinum catalyst containing about 75 weight percent lead.

The unusual selectivity for oxidizing the more deleterious components of exhaust gas caused by the addition of lead to a platinum catalyst is demonstrated by the following tests. In these tests, vapors containing pure hydrocarbons mixed with helium and oxygen are passed through a catalyst bed maintained at 300° C. and the percent of oxidation measured. The catalyst bed employed contains 82 cubic centimeters of the test catalyst. A stream consisting of 20 mole percent oxygen and 80 mole percent helium is continuously passed through the catalyst bed and then through a Perkin-Elmer Model 154 vapor fractometer, thus establishing a base line curve on the fractometer. Once the base line is established, a 5 microliter sample of hydrocarbon undergoing tests is injected into the helium-oxygen stream ahead of the catalyst bed. When the mixture passes through the catalyst bed any oxidation occurring lowers the oxygen content of the carrier stream, resulting in a negative peak in the vapor fractometer base line. The negative height of this peak is calibrated in terms of percent oxidation.

In the first test, the oxidative efficiency of a platinum catalyst supported on a calcium phosphate carrier was determined for five different hydrocarbons; 2,3-dimethyl butane, n-hexane, cyclohexane, 1-hexene and benzene. Following this, the efficiency of a similar catalyst, but containing lead as lead fluoride, was determined. The following table compares the results obtained.

|  | Percent oxidation | |
|---|---|---|
|  | 0.07% Pt on $Ca_3(PO_4)_2$ | 0.06% Pt on $PbF_2 \cdot 3Ca_3(PO_4)_2$ |
| 2,3-dimethyl butane | 95.7 | 8.1 |
| n-Hexane | 93.6 | 8.4 |
| Cyclohexane | 108.6 | 10.0 |
| 1-hexene | 14.9 | 115.0 |
| Benzene | 84.5 | 109.3 |

In the above table, values over 100 percent represent essentially complete oxidation.

The reversal in selectivity shown in the above table is completely unexpected. Heretofore, lead has been suspected of having a deleterious effect on oxidation catalysts, but in the catalysts of the present invention it is shown that the lead has switched the selectivity of the catalyst to favor the oxidation of olefinic components over paraffinic components. The high degree of utility afforded by this reversal of selectivity is obvious because the catalysts of this invention are active against the very components of exhaust gas which are believed to cause so-called photochemical smog. Thus, the catalysts of this invention are eminently useful in removing the more noxious components of the exhaust gas of internal combustion engines.

Another test was carried out in which two silica alumina supported catalysts were compared. One contained only platinum while the second contained both platinum and lead (catalyst prepared in Example 3). The following table compares the results obtained in the forementioned tests with paraffins versus the results obtained with olefins on these two catalysts.

|  | Percent oxidation | |
|---|---|---|
|  | Pt on silica alumina | Pt+Pb on silica alumina |
| 3-dimethyl butane | 102.9 | 1.0 |
| Hexane | 102.1 | 2.1 |
| n-ycylohexane | 104.0 | 1.9 |
| hexene | 27.6 | 90.0 |

These results again demonstrate the unexpected selectivity of the catalysts of this invention for the most harmful components in exhaust gas; that is, olefins.

The catalysts of this invention are beneficially employed in reducing the smog forming potential of exhaust gas by simply placing the catalysts in a suitable container and incorporating the so-contained catalyst into the exhust system of the internal combustion engine. Thus, the container, which may also function as a muffler, will have openings to receive and discharge exhaust gas. To firmly retain the catalyst material the receiving and discharge openings may be covered with wire screen. The container may have internal baffling to allow the greatest contact between catalyst and exhaust gas and/or to use the hot reaction gases to heat the incoming exhaust gases. To aid the oxidation, secondary air may or may not be introduced into the system. One of the advantages of the catalyst of this invention is that it has a lower oxygen requirement in oxidizing a gas exhaust stream because it does not consume oxygen in burning pariffinic hydrocarbons that do not contribute to smog formation.

Thus, another embodiment of this invention is a catalytic muffler containing the catalysts of this invention. Such a muffler forms a part of the exhaust system of an internal combustion engine. The muffler can be located at any point in the exhaust system, but preferably not too remote from the engine. If the muffler is too remote, the exhaust gas will be cool and efficiency will be impaired.

The catalytic muffler comprises an enclosed container-like body made of materials capable of withstanding the heat generated during the oxidation of the unburned hydrocarbon and carbon monoxide in the exhaust gas. The exhaust gas may be passed into the muffler body with or without the addition of secondary air. In passing through the muffler body to reach the exhaust gas outlet, the exhaust gas together with oxygen contacts the oxidation catalysts of this invention which are located within the muffler body. In this manner, the oxidation of the unburned constituents, especially the olefins in the exhaust gas, are catalyzed. The oxidized exhaust gas then passes out through the exhaust gas outlet and subsequently into the atmosphere in a non-noxious form.

The catalysts of this invention can be used alone or together with other catalysts. For example, if complete oxidation of all constituents in an exhaust stream is desired, the lead promoted platinum catalyst might be used to oxidize the olefinic and aromatic components and another catalyst to oxidize the remaining components. The two catalysts might be mixed and then added to the catalytic muffler, or they might be placed in the muffler in strata so that first one class of components are oxidized and then the other class. When this method is employed it is generally preferred to place the catalysts of this invention nearest the exhaust gas intake because they display catalytic activity at lower temperatures than most catalysts and can serve to heat the exhaust stream to a temperature where a different catalyst becomes active in a second strata.

The present catalysts can be used to convert the exhaust gas formed during the combustion of any gasoline. The gasoline can be of aliphatic, aromatic or olefinic type including both straight run and catalytically produced gasoline and any and all mixtures thereof. The gasoline can contain antiknock agents such as tetraethyllead, tetraphenyllead, tetramethyllead, mixtures of alkyl leads such as tetraethyl lead-tetramethyl lead mixtures, ferrocene, methylferrocene, methylcyclopentadienyl manganese tricarbonyl, cyclopentadienyl nickel nitrosyl, and the like. The gasoline can likewise contain other additives such as scavengers, e.g., ethylenedichloride and ethylenedibromide, antioxidants such as phenylenediamine, 2,6-di-tert-butylphenol, 4,4′-methylene bis(2,6-di-tert-butylphenol), 2,4,6-tri-tert-butylphenol, and the like. Other components which can be present in the gasoline include dyes and deposit modifiers such as trimethylphosphate, dimethylphenylphosphate, tricresylphosphate, methyldiphenylphosphate, and the like.

In addition to use in spark ignition internal combustion engines, the present catalyst may also be used to reduce or eliminate unburned hydrocarbons and carbon monoxide from the exhaust products of combustion processes in general. This includes the compression ignition engine, oil, gas and coal furnaces, residual fuel burners, and the like.

I claim:

1. A catalyst especially adapted to catalyze the unburned olefinic and aromatic constitutents of the exhaust gas of internal combustion engines, said catalyst consisting essentially of a hexagonal apatite support having the composition $$MX_2 \cdot 3M'_3(PO_4)_2$$

wherein M and M′ are metals selected from the class consisting of lead and the Group II–A and II–B metals, such that at least one of said metals is lead; and X is a halogen, said support containing from 0.0005 to 5 weight percent platinum, based upon the weight of the catalyst.

2. A method of oxidizing the unburned olefinic and aromatic constituents of the exhaust gas of internal combustion engines, said method comprising contacting said exhaust gas together with oxygen with a catalyst, said catalyst consisting essentially of a hexagonal apatite support having the composition $$MX_n \cdot 3M'_3(PO_4)_{n'}$$

wherein M and M′ are metal cations, at least one of which is lead, X is a halogen, $n$ is the valence of M, and $n'$ is the valence of M′, said support containing from 0.0005 to 5 weight percent platinum, based upon the weight of the catalyst.

3. A process for preparing a catalyst especially adapted to catalyze the oxidation of the unburned olefinic and aromatic constituents of the exhaust gas of internal combustion engines, said process comprising the steps of:
 (A) mixing together an alumina, a platinum compound and a lead compound in quantities such that the final catalyst contains from about 0.0005 to 5 weight percent platinum and from about 0.001 to 75 weight percent lead as said lead compound, based upon the weight of the catalyst;
 (B) adding sufficient acid to digest the mixture into a plastic extrudable mass;
 (C) extruding said plastic mass;
 (D) drying the resultant extrudate; and
 (E) calcining the dried extrudate.

4. A process for preparing a catalyst especially adapted to catalyze the oxidation of the unburned olefinic and aromatic constituents of the exhaust gas of internal combustion engines, said process comprising the steps of:
 (A) impregnating a suitable support with an acid of phosphorus;
 (B) drying the acid treated support;
 (C) impregnating the acid treated support with a platinum compound and a lead compound;
 (D) drying the platinum-lead impregnated support; and
 (E) calcining the dried platinum and lead impregnated support.

5. The process of claim 4 wherein said support is an activated alumina and wherein said support is impregnated with an acid of phosphorus in quantities such that the acid impregnated support contains from 0.01 to 15 weight percent phosphorus.

6. The process of claim 5 wherein said acid of phosphorus is orthophosphoric acid and wherein said acid treated support is impregnated with a platinum compound and a lead compound in quantities such that the catalyst contains from about 0.0005 to 5 weight percent platinum and from about 0.001 to 25 weight percent lead as said lead compound, based upon the weight of the catalyst.

7. A method of oxidizing the unburned olefinic and aromatic constituents of the exhaust gas of internal combustion engines, said method comprising contacting said exhaust gas together with oxygen with a catalyst made by the process of commingling a platinum compound and a lead compound with a suitable support selected from the group consisting of alumina, silica-alumina, thoria, magnesia, zirconia, calcium phosphate and hexagonal apatites having the composition $MX_n \cdot 3M'_yZ_{n'}$ wherein M and M′ are metal actions having valence $n$ and $n'$, X is a halogen and Z is a radical of valence $y$ and is selected from the group consisting of phosphate, arsenate, vanadate and sulfate anions, and calcining the commingled support.

8. The method of claim 7 wherein said catalyst is made by the process of:
 (A) impregnating a suitable support with a platinum compound and with a lead compound, and
 (B) calcining the impregnated support.

9. The method of claim 8 wherein said support is an activated alumina and wherein said support is impregnated with a platinum compound in quantities such that the catalyst contains from about 0.0005 to 5 weight percent platinum and with a lead compound in quantities such that the catalyst contains from about 0.001 to 75 weight percent lead, based upon the weight of the catalyst.

10. The method of claim 7 wherein said catalyst is made by the process of:
 (A) mixing together an alumina, a platinum compound and a lead compound in quantities such that the final catalyst contains from about 0.0005 to 5 weight percent platinum and from about 0.001 to 75 weight percent lead, based upon the weight of the catalyst,
 (B) adding sufficient acid to digest the mixture into a plastic extrudable mass,
 (C) extruding said plastic mass,
 (D) drying the resultant extrudate, and
 (E) calcining the dried extrudate.

11. The method of claim 7 wherein said catalyst is made by the process of:
 (A) impregnating a suitable support with an acid of phosphorus,
 (B) drying the acid-treated support,
 (C) impregnating the acid-treated support with a platinum compound and a lead compound,
 (D) drying the platinum-lead impregnated support, and
 (E) calcining the dried platinum and lead impregnated support.

12. The method of claim 11 wherein said support is an activated alumina and wherein said support is impregnated with an acid of phosphorus in quantities such that the acid-impregnated support contains from 0.01 to 15 weight percent phosphorus.

13. The method of claim 12 wherein said acid of phosphorus is ortho-phosphoric acid and wherein said acid-treated support is impregnated with a platinum compound and a lead compound in quantities such that the catalyst contains from about 0.0005 to 5 weight percent platinum and from 0.001 to 25 weight percent lead, based upon the weight of the catalyst.

(Other references on following page)

References Cited

UNITED STATES PATENTS

| | | | |
|---|---|---|---|
| 3,112,277 | 11/1963 | Michalko | 23—2 X |
| 3,149,081 | 9/1964 | Bowman et al. | 252—437 |
| 3,207,704 | 9/1965 | Stephens et al. | 23—2 X |
| 3,231,516 | 1/1966 | Gary | 23—2 X |
| 3,121,694 | 2/1964 | Michalko | 23—2 |

OTHER REFERENCES

Chem. Abstracts, vol. 52, page 64b (December 1958).

OSCAR R. VERTIZ, *Primary Examiner.*

A. GREIF, *Assistant Examiner.*

U.S. Cl. X.R.

252—460, 466